US012017410B1

(12) United States Patent
Wilke et al.

(10) Patent No.: US 12,017,410 B1
(45) Date of Patent: Jun. 25, 2024

(54) HOLLOW EXTRUSION NOZZLE

(71) Applicant: Worcester Polytechnic Institute, Worcester, MA (US)

(72) Inventors: Ethan R. Wilke, Fort Collins, CO (US); Loris Fichera, Boston, MA (US); Nicholas E. Pacheco, Westport, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 18/380,500

(22) Filed: Oct. 16, 2023

Related U.S. Application Data

(60) Provisional application No. 63/459,816, filed on Apr. 17, 2023, provisional application No. 63/434,503, filed on Dec. 22, 2022.

(51) Int. Cl.
| | |
|---|---|
| *B33Y 10/00* | (2015.01) |
| *B29C 64/118* | (2017.01) |
| *B29C 64/209* | (2017.01) |
| *B33Y 30/00* | (2015.01) |

(52) U.S. Cl.
CPC .......... *B29C 64/209* (2017.08); *B29C 64/118* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 2015/0210009 A1* | 7/2015 | Johnson .................. | B05B 17/04 |
| | | | 425/375 |
| 2016/0207108 A1* | 7/2016 | Daum ...................... | B22F 12/22 |
| 2019/0039310 A1* | 2/2019 | Busbee ................ | A43B 13/026 |

(Continued)

FOREIGN PATENT DOCUMENTS

| | | |
|---|---|---|
| CN | 109878072 A | 6/2019 |
| CN | 210706077 U | 6/2020 |

(Continued)

OTHER PUBLICATIONS

Armanov, Ernar, "Additive Manufacturing of Patient-Specific Tubular Continuum Manipulators", vol. 9415, Mar. 2015, pp. 1-9.

(Continued)

*Primary Examiner* — Yung-Sheng M Tsui
(74) *Attorney, Agent, or Firm* — Armis IP Law, LLC (57) ABSTRACT

A nozzle apparatus for a 3D printer employs a center post or shape and extrudes a circumferential, tubular form having a central void. The nozzle includes a radial arrangement of prongs or supports around a center post, which provides space for molten print medium to flow in a 360° form around the center post. The nozzle extrudes a hollow tubular form around the post that can lay a tube shaped article on a perpendicular print bed, or can be used to deposit high resolution, hollow cylindrical segments for forming lightweight articles with less volume of print medium required due to the hollow extruded shape. A stream of air or gas may be emitted into the center of the extrusion for maintaining a tubular shape. Other suitable shapes may be employed by altering the contour of the center post and the bore.

10 Claims, 10 Drawing Sheets

(56) References Cited

U.S. PATENT DOCUMENTS

| | | | | |
|---|---|---|---|---|
| 2019/0217538 A1* | 7/2019 | Katon | ................ | B33Y 10/00 |
| 2019/0328029 A1* | 10/2019 | Molnar | ................ | B33Y 40/00 |
| 2020/0023570 A1* | 1/2020 | Wiest | ................ | C03B 19/1075 |
| 2020/0061910 A1 | 2/2020 | Lewis et al. | | |
| 2020/0298479 A1* | 9/2020 | Sweeney | ................ | B33Y 30/00 |
| 2023/0118248 A1* | 4/2023 | Kozlovski | ................ | B33Y 70/00 |
| | | | | 425/375 |

FOREIGN PATENT DOCUMENTS

| | | | | |
|---|---|---|---|---|
| CN | 111923410 A | 11/2020 | | |
| EP | 3736106 A1 * | 11/2020 | ................ | B22F 10/25 |
| EP | 3445568 B1 | 12/2021 | | |
| WO | WO-2021145866 A1 * | 7/2021 | ................ | B23K 26/035 |

OTHER PUBLICATIONS

D'Almeida, Jesse Francisco, "Making Concentric Tube Robots More Accessible: A New Open-Source Design Made of 3D-Printed and Other Easy-to-Source Materials", May 2021, pp. 1-52.

Morimoto, Tania K., et al. "Design of 3-D Printed Concentric Tube Robots", IEEE Trans Robot. Author manuscript; available in PMC Nov. 1, 2017, pp. 1-32.

Picho, K., "Multi Jet Fusion of Nylon-12: A Viable Method To 3D-print Concentric Tube Robots?", Apr. 1, 2022, pp. 1-2.

Shaqour, Bahaa, et al., "Novel design for an additively manufactured nozzle to produce tubular scaffolds via fused filament fabrication", vol. 49, Jan. 2022, pp. 1-11.

International Search Report, PCT/US2023/035222, pp. 1-4, Feb. 6, 2024.

* cited by examiner

HOLLOW EXTRUSION NOZZLE

RELATED APPLICATIONS

This patent application claims the benefit under 35 U.S.C. § 119(e) of U.S. Provisional Patent App. No. 63/434,503, filed Dec. 22, 2022, entitled "HOLLOW EXTRUSION NOZZLE," and on U.S. Provisional Patent App. No. 63/459,816, filed Apr. 17, 2023, entitled "HOLLOW EXTRUSION NOZZLE," both incorporated herein by reference in entirety.

BACKGROUND

3-Dimensional (3D) printers are evolving for efficient, low cost use in tasks that traditionally required large machined molds or dies to produce. Efficient manufacturing is achievable for modest volumes of printed articles without the upfront investment in a large, expensive die. 3D printers employ a nozzle for extruding a print medium, often through a process known as fused deposition modeling, where a polymer filament passes through a heated nozzle, and emerges in a molten state to flow onto an accumulating article, where it solidifies and fuses to previous courses or layers of the printed article.

SUMMARY

A nozzle apparatus for a 3D printer employs a center post or shape and extrudes a circumferential, tubular form having a central void. The nozzle includes a radial arrangement of prongs or supports around a center post, which provides space for a molten print medium to flow in a 360° form around the center post. The nozzle extrudes a hollow tubular form around the post that can lay a tube shaped article on a perpendicular print bed, or can be used to deposit high resolution, hollow cylindrical segments for forming lightweight articles with less volume of print medium required due to the hollow extruded shape. A stream of air or gas may be emitted into the center of the extrusion for maintaining a tubular shape. Other suitable shapes may be employed by altering the contour of the center post and the bore.

Configurations herein are based, in part, on the observation that extrusion printers such as 3-Dimensional (3D) and Fused Deposition Modeling (FDM) printers are gaining popularity for additive manufacturing and similar generation of low cost, precision formation of components. Unfortunately, conventional approaches to 3D printing tend to generate solid or dense representation of the volumes so formed, which adds weight and consumes additional material. Accordingly, configurations herein substantially overcome the shortcomings of solid, homogeneous moldings by extruding a tubular form with a hollow cross section. By extruding a hollow form of a closed shape surrounding a void, solid volumes are formed from a network or iteration of the closed shape, saving material without substantially sacrificing strength. Injection of air into the cross-section void during formation prevents the closed shape from contracting onto itself from reduced pressure. Tubular members for fluid transport may also be formed.

In further detail, the 3D printing extrusion nozzle includes an inlet configured for receiving molten extrusion material, and a coupling for engaging the inlet with an extrusion source. An extrusion channel fluidically couples to the inlet and leads to an extrusion outlet, and an insert disposed in the extrusion channel imparts a closed shape to the molten extrusion material upon passage through the outlet for forming a hollow tubular extrusion. An air injection channel in the insert provides an airflow to fill the void formed in the hollow for preventing low pressure from collapsing the hollow tubular shape.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Additive manufacturing (3D printing) allows engineers and researchers to create complex and intricate geometries that would otherwise be incredibly difficult to manufacture with traditional techniques (e.g., subtractive manufacturing or injection molding). The most commonly available form of additive manufacturing is FDM printing. FDM printers use a material extrusion process, where thermoplastics are deposited layer by layer and parts are built from the ground up. Thermoplastics are plastics that at some temperatures become soft and flexible, and solidify when cooled. Feedstock includes a filament, usually rolled on a spool. Common filament types include Polylactic acid (PLA), Thermoplastic polyurethane (TPU), Acrylonitrile butadiene styrene (ABS), Acrylonitrile styrene acrylate (ASA) and Polycarbonate (PC). Although FDM printers excel at speed, build size, and material availability, they struggle to produce high-resolution prints at a small scale, and the use of layers leads to anisotropic parts that are weaker at layer lines and therefore compromise the material's mechanical properties. 3D printers typically generate their "prints" by layering material on top of previously laid material in order to create the desired geometries and parts.

One area where current methods of 3D printing have fallen short is in the creation of small (<2 mm outer diameter), thin walled, and flexible tubular structures. The small size and hollow geometries of these structures are difficult to manufacture using current 3D printing methods on the market. FDM printers are challenged in producing high-resolution and accurate shapes for tubes this size. The highest-resolution printers currently available on the market (selective laser sintering, or SLS and stereolithography, or SLA) can produce smaller tubes than FDM printers but are still incapable of producing tubes smaller than 3 mm and the tubes that they can produce suffer from inaccurate OD and ID dimensions and inconsistencies between prints. The largest issue that affects tubes created on all current 3D printers is their anisotropic material properties from the layered construction.

Figure 1:
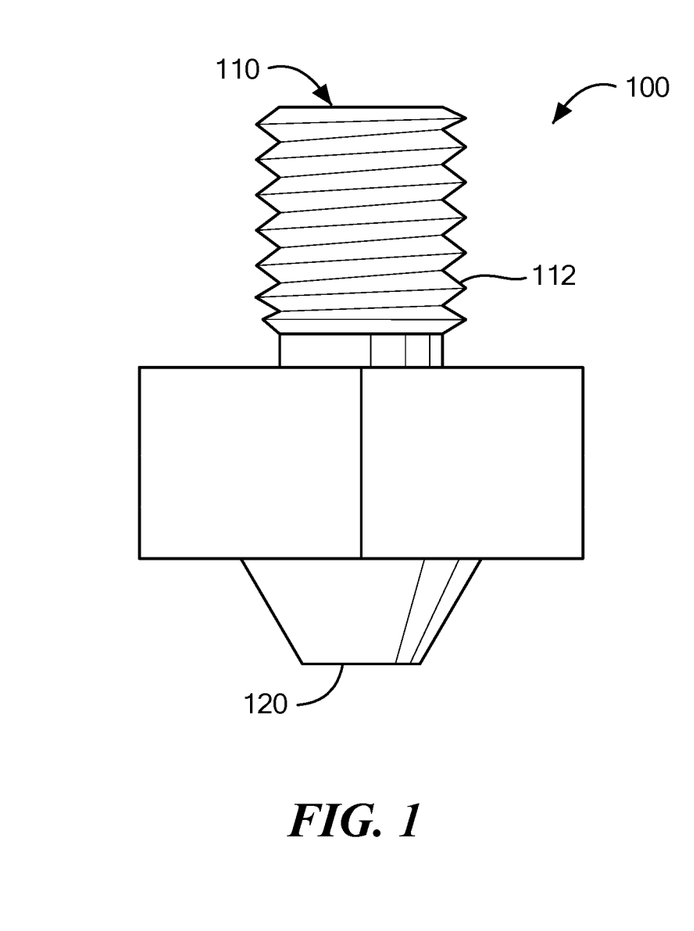
FIG. 1 is a side elevation of an example configuration of the 3D printer nozzle as described herein.

3D printers generally operate via extrusion for rendering the printed object. A print nozzle is the vessel through which the molten print medium is extruded in a controlled manner. FIG. 1 is a side elevation of an example configuration of the 3D printer nozzle as described herein. Referring to FIG. 1, a 3D printing extrusion nozzle 100 includes an inlet 110 configured for receiving molten extrusion material, and a coupling 112 for engaging the inlet 110 with an extrusion source. The coupling 112 is typically threaded for interchange of nozzles between 3D printers of different vendors. An extrusion channel through the nozzle is fluidically coupled to the inlet and leads to an extrusion outlet 120. The extrusion outlet determines the physical shape and size of the extruded material, typically molten feedstock filament referred to as "melt."

In order to maintain the benefits of FDM printers, (speed, build size, and material availability), while also creating small, isotropic, and high-resolution extrusions, configurations herein depict a beneficial nozzle design that can be used to retrofit conventional FDM 3D printers. This nozzle design allows for any suitable melted thermoplastic to be pushed into the nozzle and emerge in a multi-feature extrusion (shapes with holes and/or non-circular shapes) such that the desired part can be "printed" in one consistent 'layer". Due to the design utilizing existing nozzle thread specifications, any FDM 3D printer can easily be adapted by simply swapping the nozzle via the coupling 112, and no further hardware modifications are required.

Figure 2:
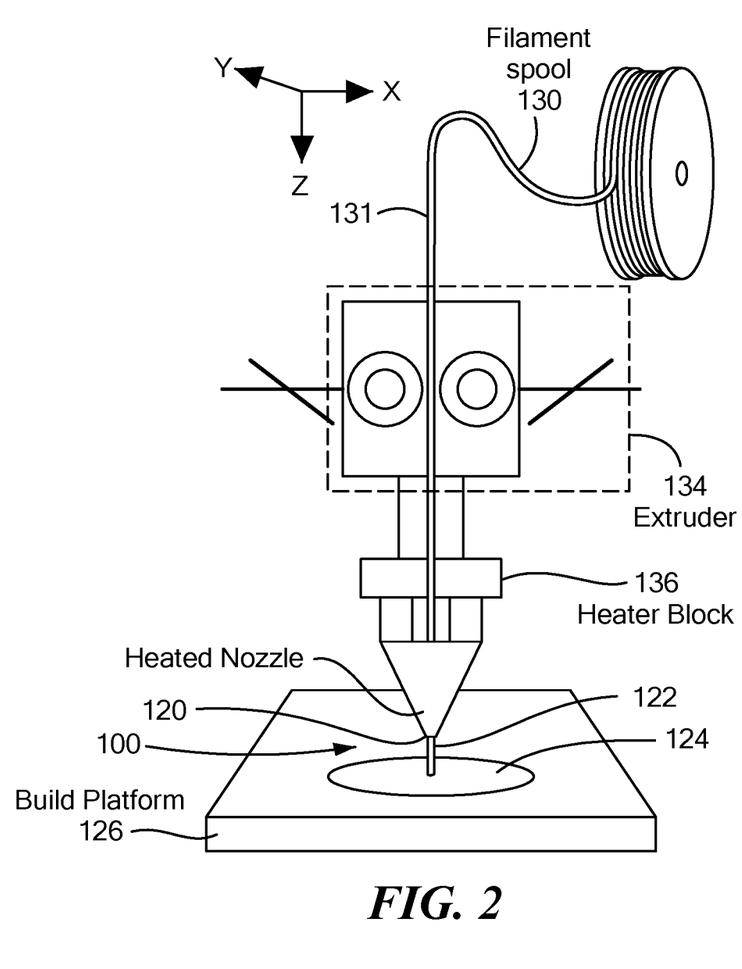
FIG. 2 is a context diagram of an extrusion apparatus for use with the 3D printer nozzle as in FIG. 1.

FIG. 2 is a context diagram of an extrusion apparatus 105 for use with the 3D printer nozzle as in FIG. 1. In a 3D printing apparatus such as an FDM setup, a print medium coiled on a spool defines the feedstock 130. The coil unwinds to deliver a filament 131 of a polymer material. An extruder 134 drives the filament 131 into a heater 136 for heating the filament 131 into a viscous liquid state. The melt 122 is forced out through the extrusion outlet 120 for aggregating into a printed article 124 on a print bed 126. The apparatus 105 guides the deposition of the melt 122 through either movement of the nozzle 100 or the print bed 126 for forming the printed article 124 by aggregation according to a programmed set of instructions.

Figure 3A:
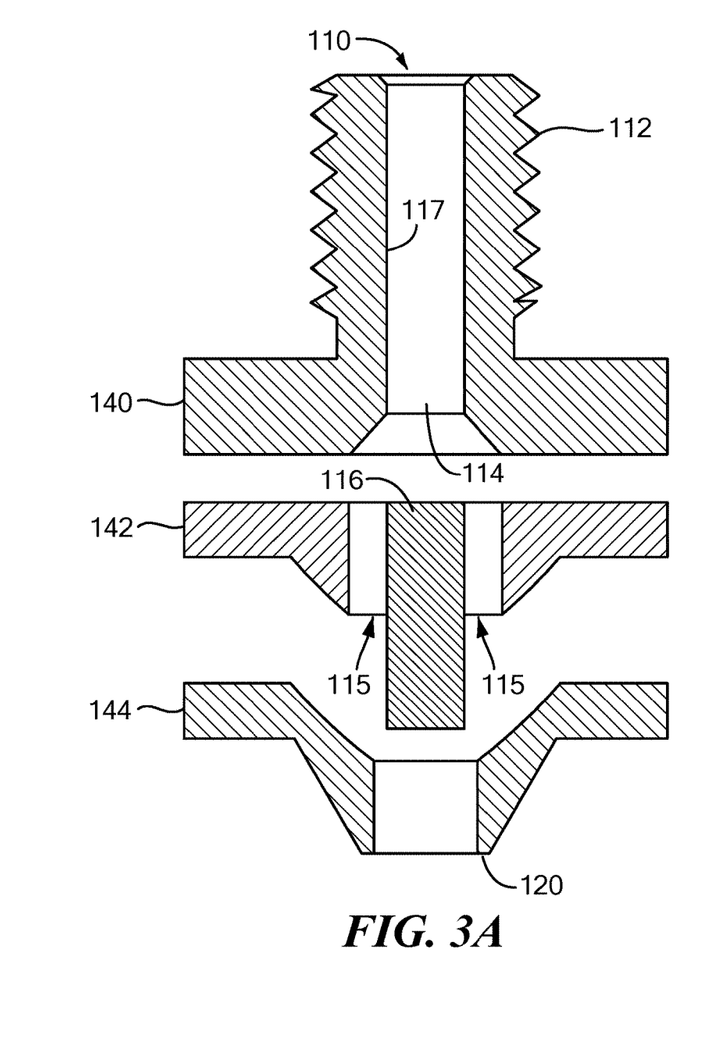
FIGS. 3A-3D are diagrams of a particular configuration of the 3D printer nozzle as disclosed herein.
Figure 3B:
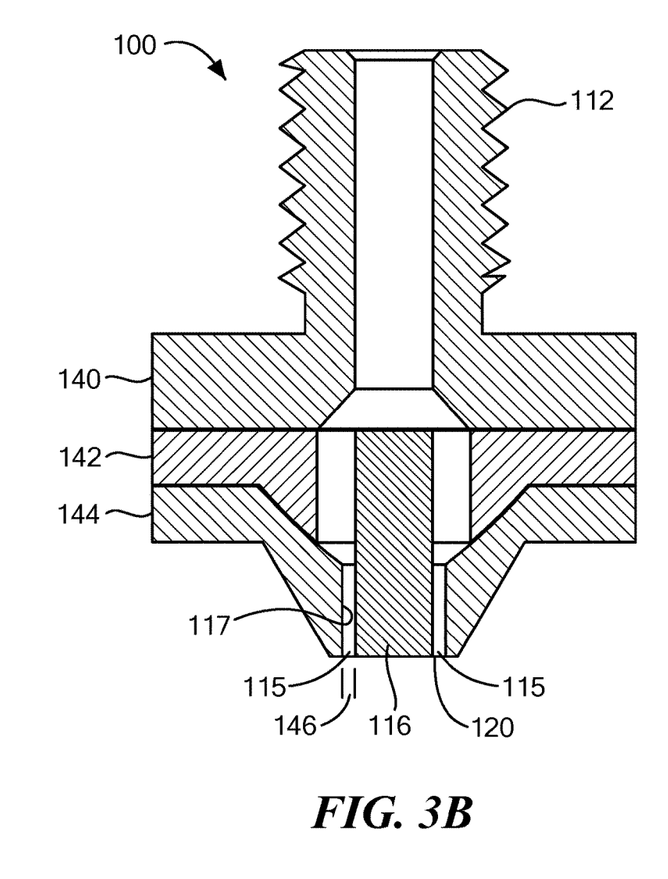
Figure 3C:
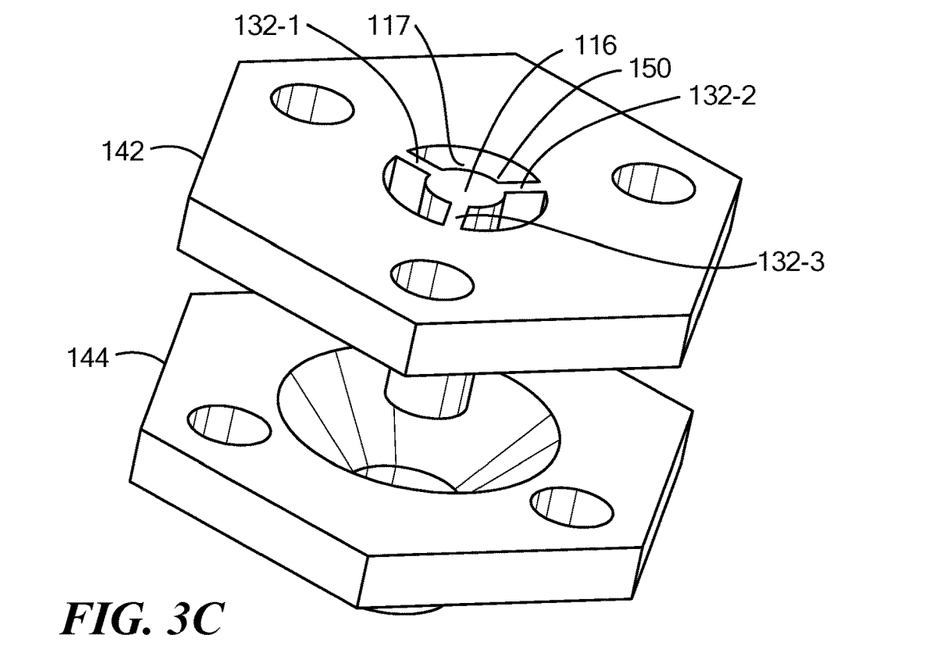
Figure 3D:
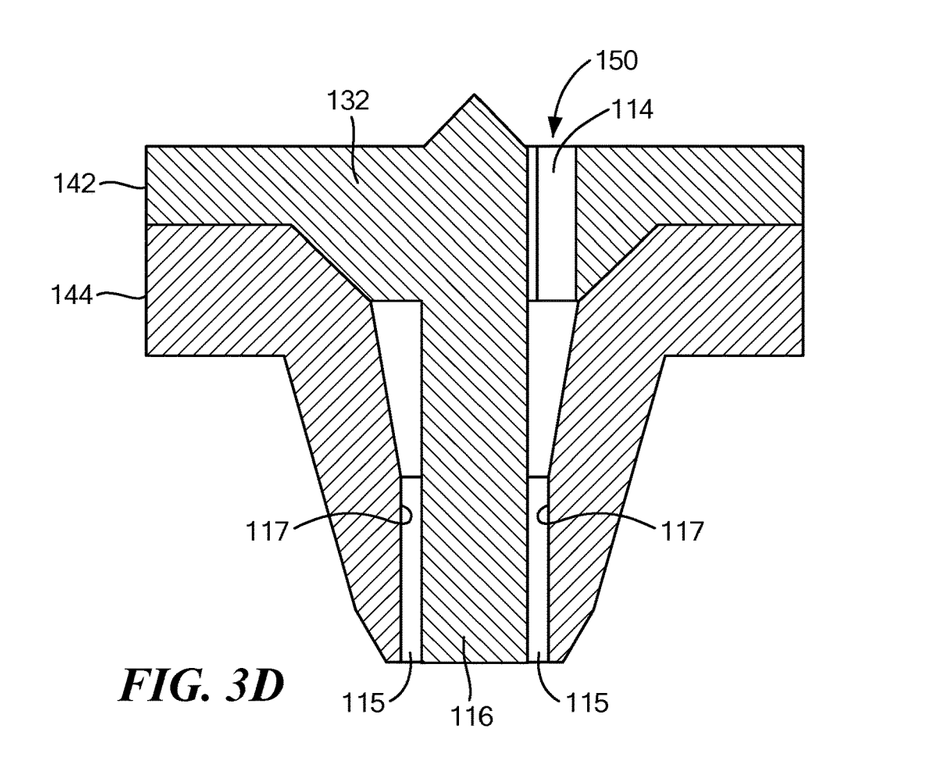

FIGS. 3A-3D are diagrams of a particular configuration of the 3D printer nozzle as disclosed herein. Referring to FIGS. 1-3D, FIG. 3A shows a cutaway exploded view of a first configuration of the nozzle 100. The construction of FIG. 3A shows a 3 part nozzle assembly, including the coupling 112 leading to an extrusion channel 114 in a first layer 140. An insert 116 formed in a second layer is 142 is disposed in the extrusion channel 114 for imparting a shape to the molten extrusion material upon passage through the outlet 120. Melt flows around the insert in a shaped channel of the circumferential gap 115 during travel through the extrusion channel 114 to the extrusion outlet 120 defined by a third layer 144. FIG. 3B shows the assembled nozzle following assembly of layers 140-144, where the insert 116 extends to or slightly beyond the extrusion outlet 120 such that the shape is retained in the extruded melt 122. FIG. 3C shows a perspective exploded view of layers 142-144, radial members 132-1..132-3 (132 generally), attached to the insert 116, such that each radial member 132 extends from an attachment point on an interior wall 117 of the extrusion channel 114. The insert 114 defines a circumferential gap 146 between the insert 116 and the interior wall 117 of the extrusion channel 114. A cross section of layers 142 and 144 engaged to show positioning of the insert 116 in FIG. 3D show how the solid radial member 132, while occupying a portion of the extrusion channel 114, allow the melt to flow in an unobstructed portion 150.

Therefore, the extrusion channel 114 has an interior wall 117 defining a shape (circular, in FIGS. 3A-3D), and the insert 116 has a shape for extruding a closed shaped form having a void, where the closed form has a closed shape cross-section based on the interior wall 117 and the insert 116. In the example configuration, where the extrusion channel 114 has a circular interior wall 117 and the insert 116 is disposed concentrically in the extrusion channel 114, a tubular shape is formed from the concentric alignment, which may be employed for printing tubular structures or volumes having a series of voids corresponding to the insert 116. The extruded, tubular shape formed by the insert of FIGS. 3A-3D forms a tube with a circular cross section and a tube wall thickness corresponding the circumferential gap 115.

Figure 4:
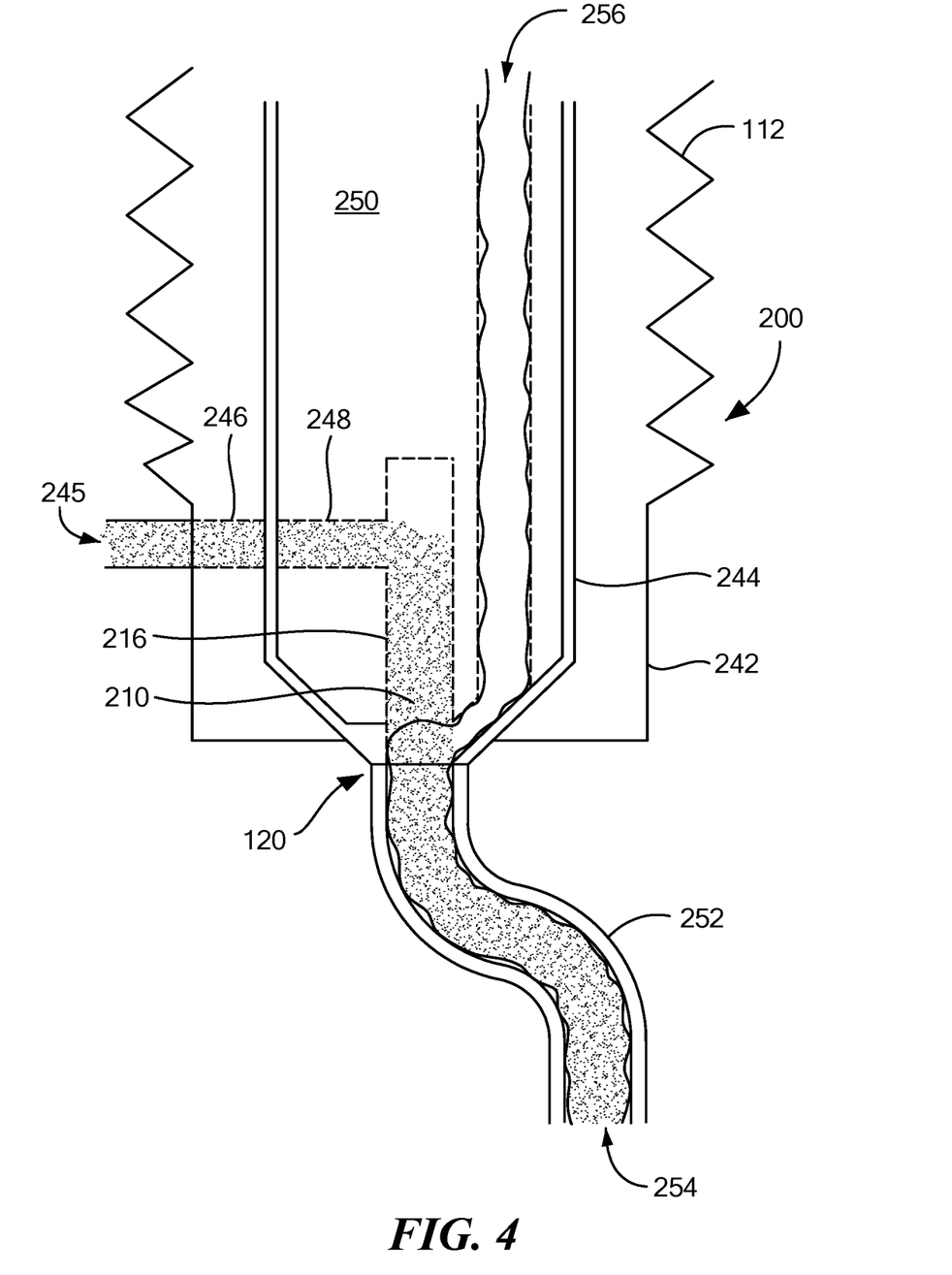
FIG. 4 is a schematic view of an alternate configuration of the 3D printer nozzle employing air injection for tubular and closed shape extrusion.

FIG. 4 is a schematic view of an alternate configuration of the 3D printer nozzle employing air injection for tubular and closed shape extrusion. Referring to FIGS. 1-4, in contrast to the 3 part construction of FIGS. 3A-3D, the nozzle 200 of FIG. 4 includes a nozzle body 242 having a cavity 244. A flow control member 250 fits snugly in the cavity 244 for receiving a gaseous flow 245. The insert 116 extends from the flow control member 250, and emits air or other gas into the void defined by the extruded closed shape.

The flow control member 250 and insert 116 is maintained in the cavity by friction and the pressure of melted plastic feedstock, avoiding the need for fasteners between the nozzle layers 140, 142, 144. The insert incorporates a central air channel for avoiding a vacuum effect inside of the newly formed closed shape tube from a lack of an air supply, which has a tendency to collapsed the tube, still a viscous melt 252, as the void created by the insert forms a lower pressure region. The configuration of FIG. 4 avoids collapse of the extruded form as there is a fresh supply of air coming in from the side of the nozzle and down through an air (gas) injection vessel 210. Not only does the gaseous flow 245 prevent a vacuum from affecting the extruded melt 152 but also enhances the cooling properties of the nozzle from a continuous supply of air.

The nozzle 200 of FIG. 4 includes an air injection vessel 210 within the insert 216 which is operable for injecting air. The insert 216 extends from flow control member 250 as it fits snugly in the cavity 244 in the nozzle body 242. An airflow gap 246 on the interior wall of the extrusion channel aligns with airflow receptacle 248 on the flow control member 250 for supplying air to the injection vessel 210 at an injection end the insert 216 nearest the outflow 120. The airflow gap 246 and the airflow receptacle 248 are aligned for fluid communication for injecting air into the void 154 formed form the closed shape extrusion 252. One or more flow channels 256 through the flow control member allow the melt to flow past the insert 216 and around the insert.

Figure 5A:
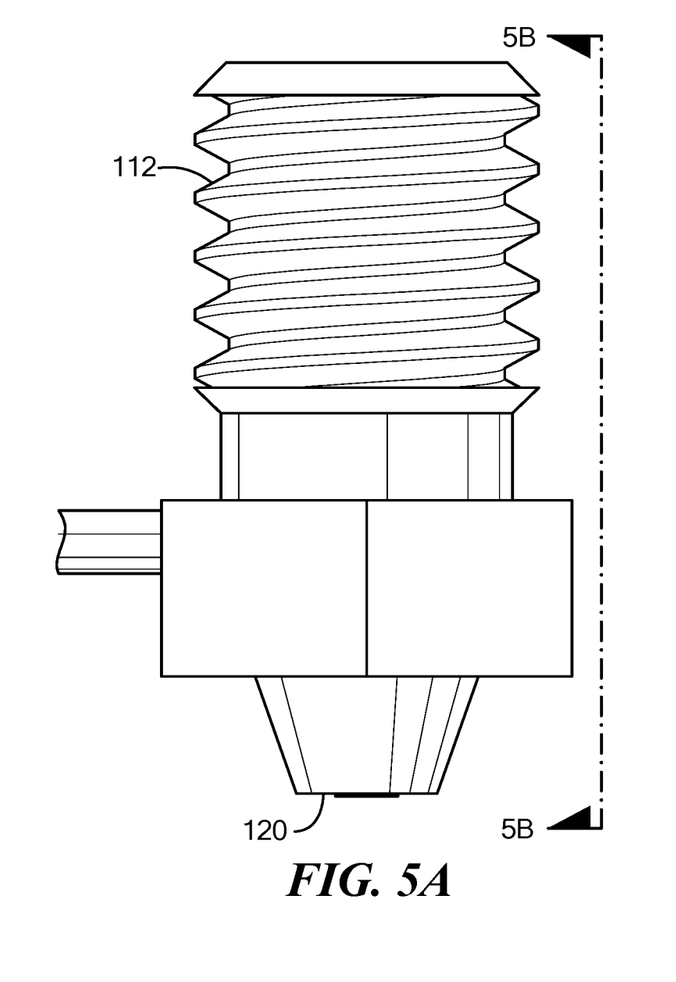
FIGS. 5A-5J are diagrams of the printer nozzle of FIG. 4.
Figure 5B:
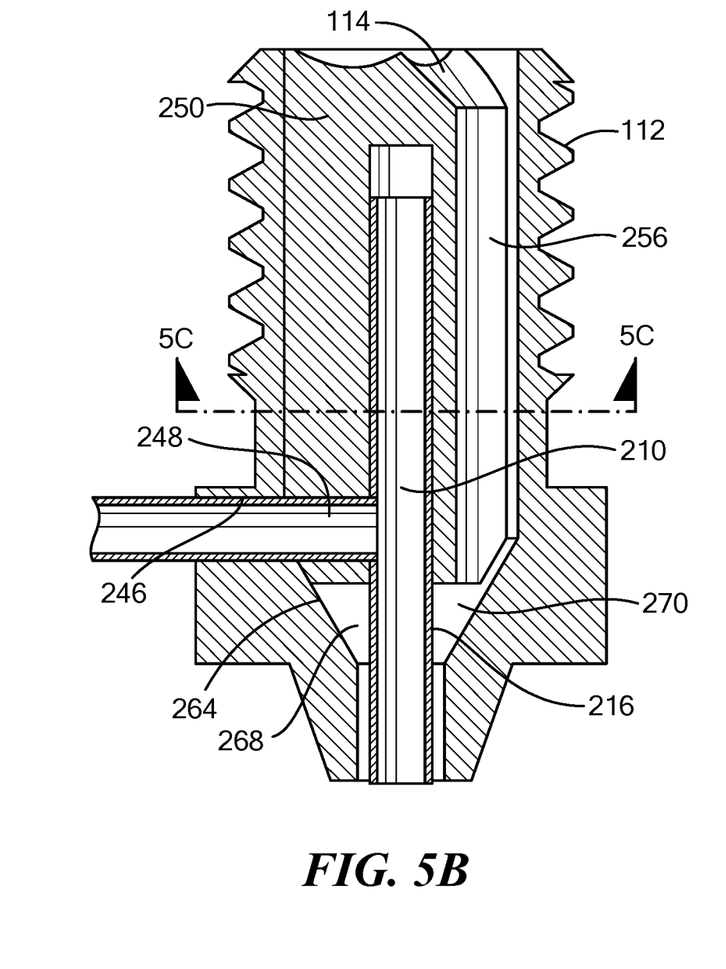
Figure 5C:
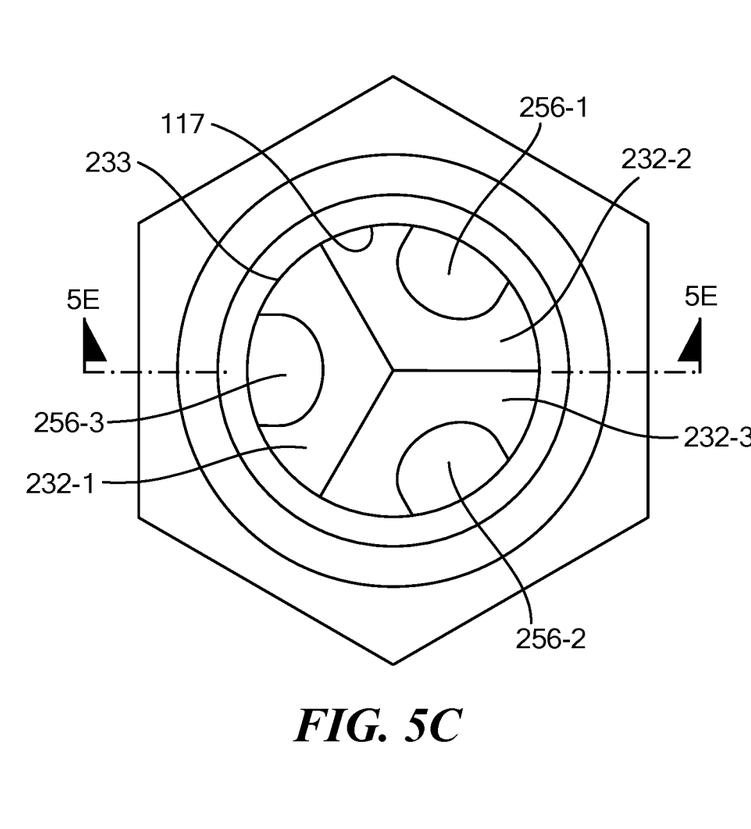
Figure 5D:
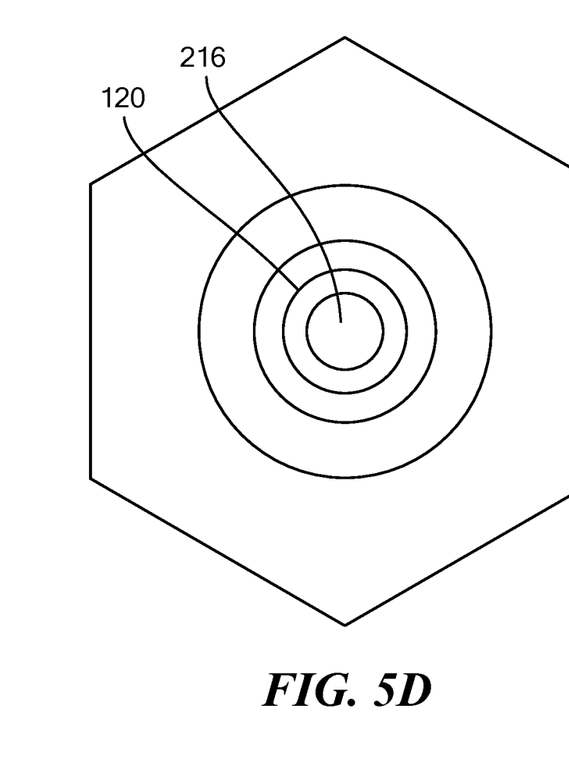
Figure 5E:
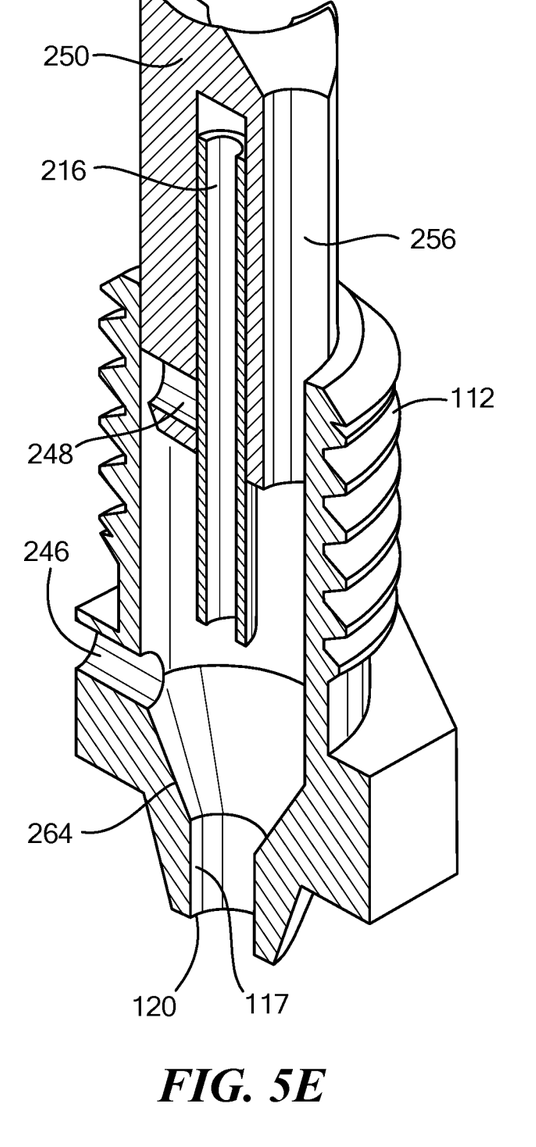
Figure 5F:
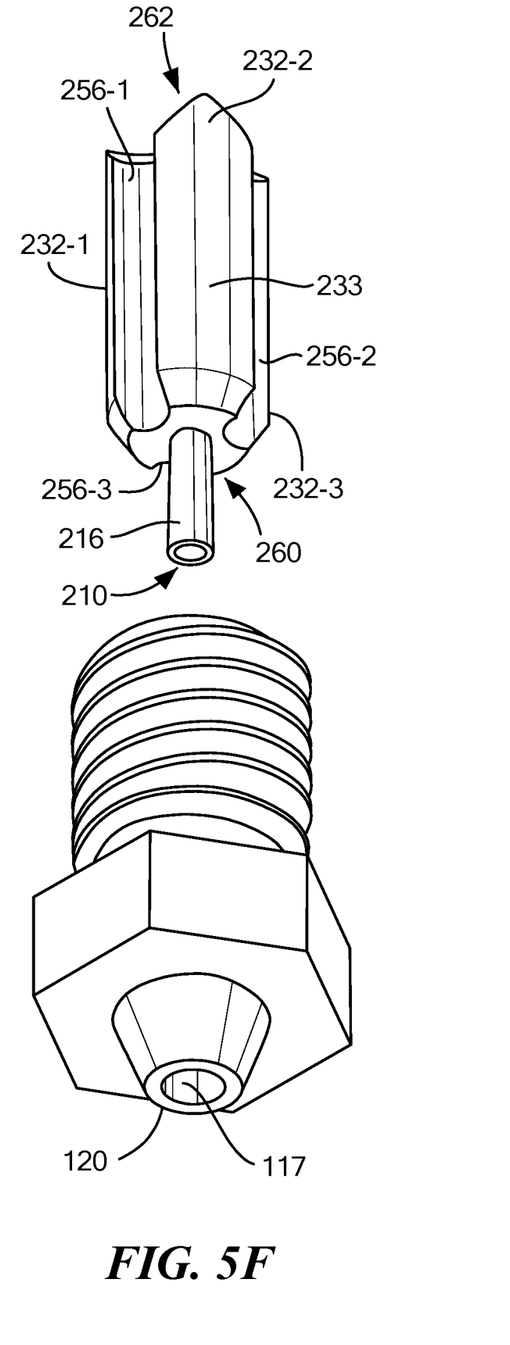
Figure 5G:
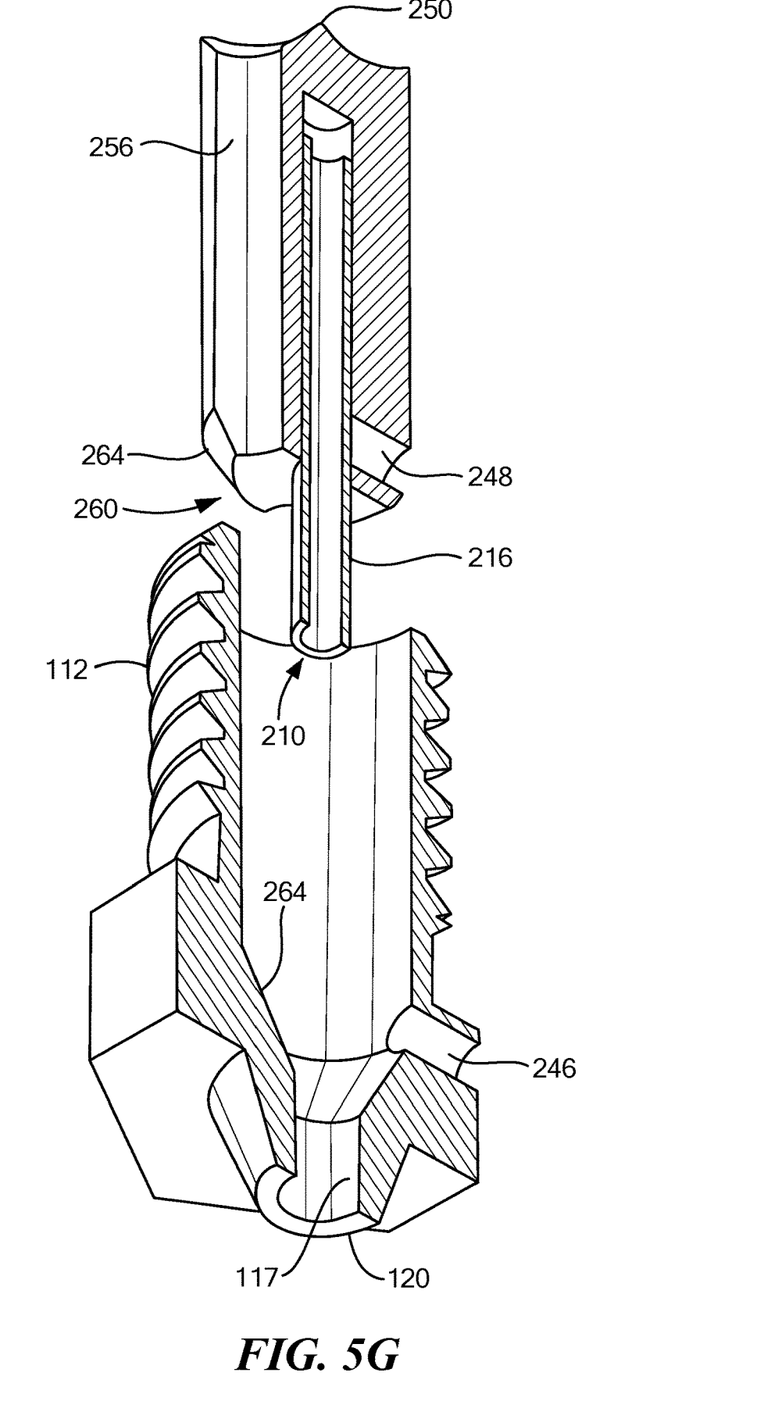

FIGS. 5A-5G are diagrams of the printer nozzle of FIG. 4. Referring to FIGS. 1-5G, the flow control member 250 includes one or more radial members 232-2..232-3 (232 generally) attached to the insert, where each radial member 232 extends or slidably engages with the interior wall 117 of the extrusion channel 114. Each radial member 232 includes a slidable portion 233-1..233-3 (233 generally), such that each slidable portion 233 engages with the interior wall 117 of the extrusion channel 114, and defines a flow channel 256-1..256-3 (256 generally) in communication with the extrusion channel between a pair of the plurality of radial members 232. Referring to FIG. 5C in particular, showing an axial cutaway view, the radial members 232 define a circumference slightly smaller than the extrusion channel 114, for slidably engaging the interior wall 117, while the flow channels 256 are defined by open areas between the radial members 232 through which the melt 122 may pass.

The flow control member 250 and insert 216 define a forward end 260 on a leading edge of the flow control member 250, and a rearward end 262. The forward end 260 is configured for insertion into the extrusion channel 114, as a body defined by the redial members 232 becomes slidably engaged with an interior wall 117 of the extrusion channel. A beveled edge 264 on an interior of the extrusion outlet 120 is adapted to engage the forward end 260 at a limit of forward travel for aligning the airflow gap 246 with the airflow receptacle 248 when the forward end 260 engages the beveled edge 264. The forward end 260 may itself have a complementary bevel for enhancing position, however the limit of forward travel aligns the airflow gap 246 and receptacle 248.

An extrusion chamber 268 forms in the extrusion channel 114 forward of the end 260 where the extrusion chamber defines an open volume 270 surrounding the insert 216 and the air injection vessel 210, The open volume 270 is responsive to air from the air injection vessel 210, where the air is enclosed in a hollow extruded form resulting from forced molten extruded melt 122 through the extrusion channel 114. The insert forms 216 a void in a cross section of a closed shape defined by an extruded melt forced through the extrusion channel.

In the example configuration, the insert 216 is concentric with the interior wall 117 of the extrusion channel 114 and the insert and interior wall define a substantially constant circumferential gap 115, which results in an extruded form 252 having a uniform tubular wall. A circular extrusion may, of course, be altered by a shape of the insert 216 and the shape of the extrusion channel 114 and the outlet 120, for forming any suitable closed shape cross-section to the extruded form 252.

Figure 5H:
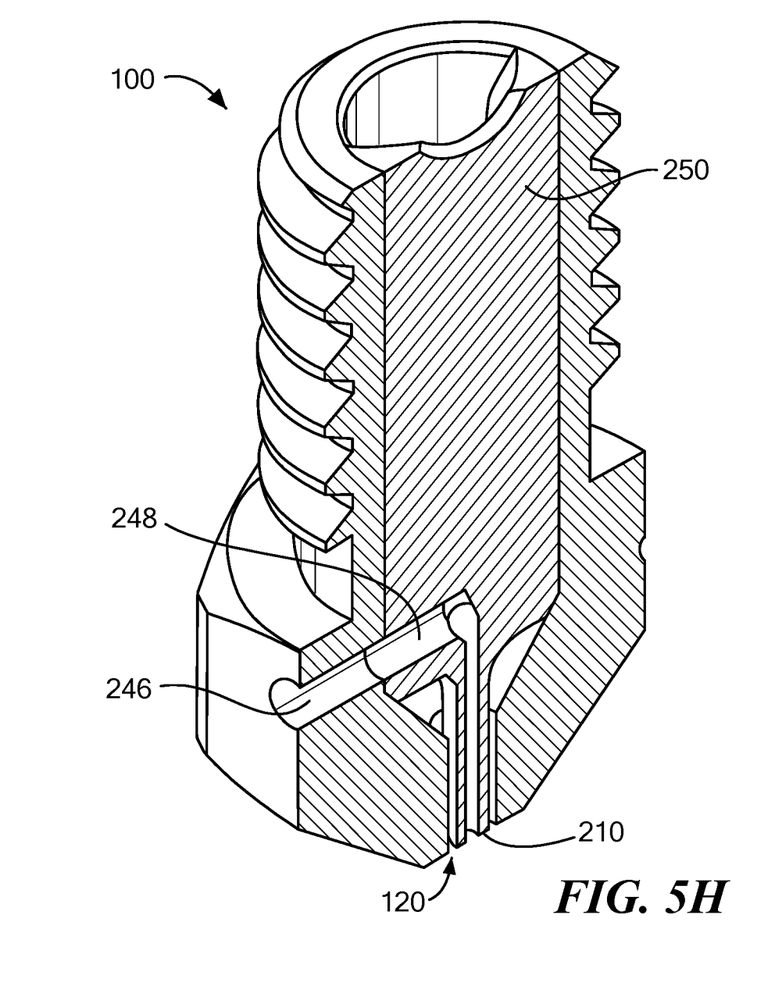
Figure 5I:
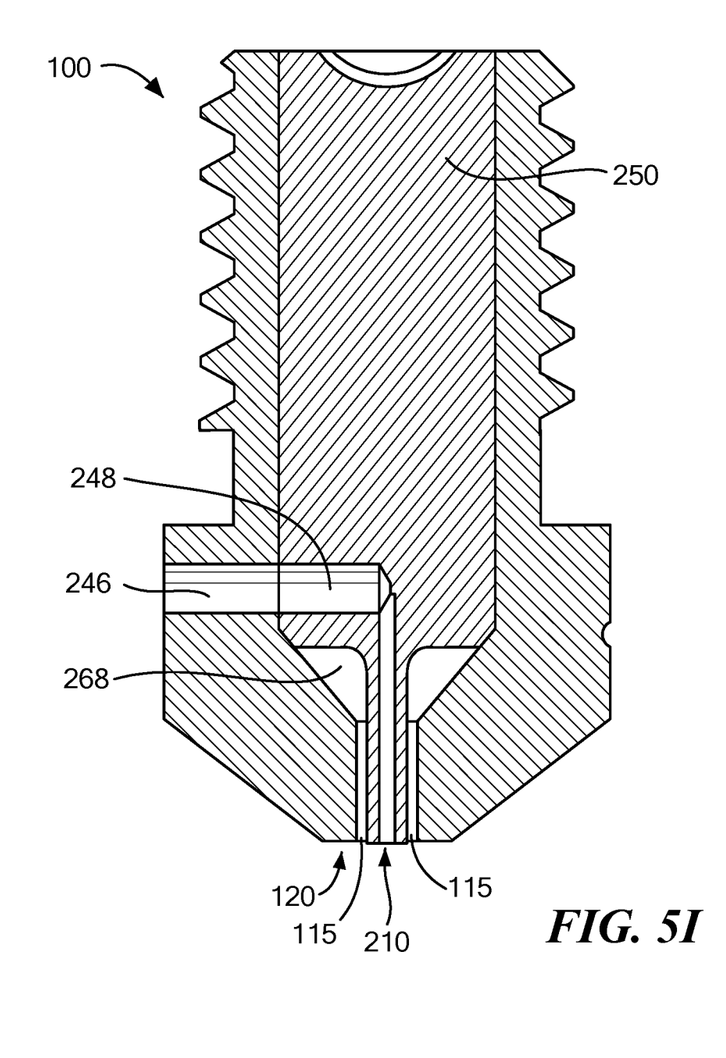
Figure 5J:
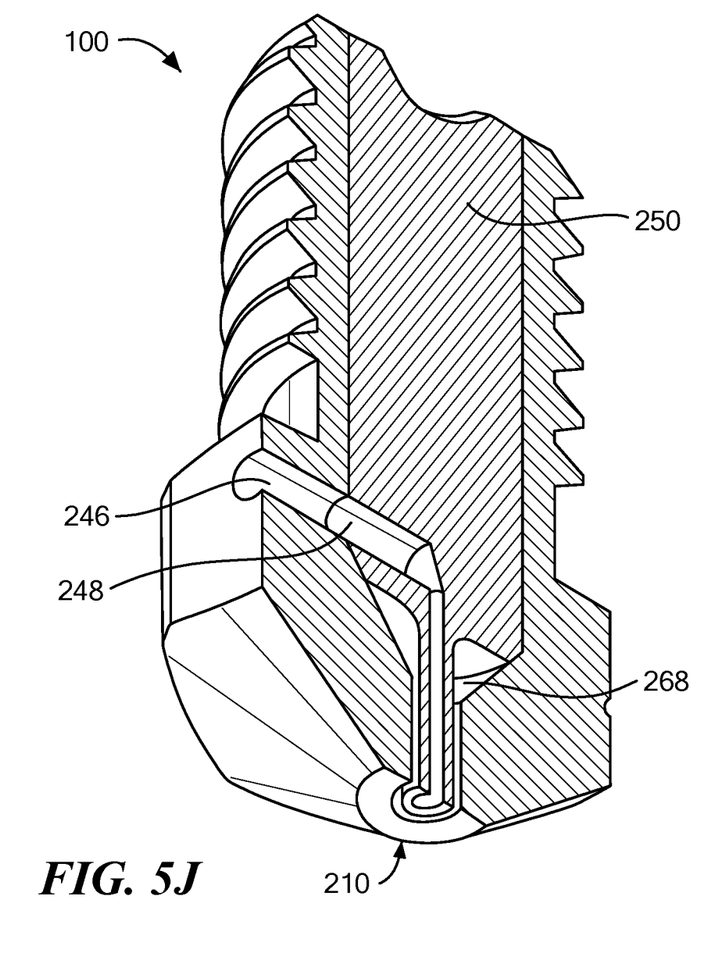

FIGS. 5H-5J depict an alternate configuration merging the insert 216 and flow control member 250, where the airflow gap 246 and the airflow receptacle 248 take an "L" shaped turn to form the extrusion outlet 120 by merging the air injection vessel 210 with the airflow receptacle in a unitary forged or fabricated element. FIG. 5H depicts an upper perspective cutaway, FIG. 5I a cutaway elevation, and FIG. 5J a lower perspective cutaway, similar to the views of FIGS. 5A-5F. No additional bore space or "T" shaped channel need be formed at the airglow receptacle because the insert 216 does not require a separate tubular piece. The insert 216 may be press fit, frictionally engaged or welded/glued into the nozzle 100.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A 3D printing extrusion nozzle device, comprising:
a coupling comprising an outlet, and an airflow receptacle in the wall of the coupling; and
a flow control member comprising one or more flow channels configured to flow molten extruded melt, a central air injection vessel fluidically connected to an insert, and an airflow gap on a wall of the flow control member, the airflow gap configured to fluidically align with the airflow receptacle and flow an air or gas, the central air injection vessel configured to form a circumferential gap in the coupling outlet when inserted into the coupling, the circumferential gap forming a channel with the one or more flow channels.

2. The device of claim 1 further comprising an air injection vessel within the insert and operable for injecting air.

3. The device of claim 1 wherein the extrusion channel has an interior wall defining a shape, and the insert has a shape for extruding a closed form having a void, the closed form having a closed shape based on the interior wall and the insert.

4. The device of claim 1 further comprising at least one radial member attached to the insert, each radial member extending from an engagement on an interior wall of the extrusion channel, further comprising at least one radial member attached to the insert, each radial member extending from an engagement on an interior wall of the extrusion channel.

5. The device of claim 4 wherein each of the at least one radial member includes a slidable insert, such that each slidable insert is engaged with the interior wall of the extrusion channel.

6. The device of claim 1 further comprising at least one radial member, attached to the insert, each radial member extending from an attachment point on an interior wall of the extrusion channel.

7. The device of claim 1 wherein the insert further comprises:
a forward end;
a rearward end; and
a body, the forward end configured for insertion into the extrusion channel, and the body slidably engaged with an interior wall of the extrusion channel.

8. The device of claim 7 further comprising:
a beveled edge on an interior of the extrusion outlet, the beveled edge adapted to engage the forward end of the insert for aligning the airflow gap with the airflow receptacle when the forward end engages the beveled edge.

9. The device of claim 1 wherein the insert forms a void in a cross section of a closed shape defined by an extruded melt forced through the extrusion channel.

10. The device of claim 1 wherein the insert is concentric with the interior wall of the extrusion channel and the insert and interior wall define a substantially constant circumferential gap, a resulting extruded form having a uniform tubular wall.

* * * * *